US012782703B2

(12) United States Patent
Raub et al.

(10) Patent No.: US 12,782,703 B2

(45) Date of Patent: Nov. 3, 2026

(54) APPARATUS, OPTICAL SYSTEM, AND METHOD FOR DIGITAL HOLOGRAPHIC AND POLARIZATION MICROSCOPY

(71) Applicants: Christopher B Raub, Silver Spring, MD (US); Van Kha Lam, Crofton, MD (US); George Nehmetallah, Washington, DC (US)

(72) Inventors: Christopher B Raub, Silver Spring, MD (US); Van Kha Lam, Crofton, MD (US); George Nehmetallah, Washington, DC (US)

( * ) Notice: Subject to any disclaimer, the term of this patent is extended or adjusted under 35 U.S.C. 154(b) by 0 days.

(21) Appl. No.: 18/075,393

(22) Filed: Dec. 5, 2022

(65) Prior Publication Data

US 2024/0077711 A1 Mar. 7, 2024

Related U.S. Application Data

(60) Provisional application No. 63/292,575, filed on Dec. 22, 2021.

(51) Int. Cl.

| | |
|---|---|
| ***G02B 21/00*** | (2006.01) |
| ***G01N 21/25*** | (2006.01) |
| ***G01N 21/45*** | (2006.01) |
| ***G02B 21/26*** | (2006.01) |
| *G01N 21/17* | (2006.01) |
| *G01N 21/21* | (2006.01) |
| *G01N 21/41* | (2006.01) |
| *G01N 21/47* | (2006.01) |

(52) U.S. Cl.

CPC ....... *G02B 21/0092* (2013.01); *G01N 21/255* (2013.01); *G01N 21/453* (2013.01); *G02B 21/26* (2013.01); *G01N 2021/1736* (2013.01); *G01N 2021/1785* (2013.01); *G01N 2021/214* (2013.01); *G01N 2021/4186* (2013.01); *G01N 2021/4792* (2013.01)

(58) Field of Classification Search

CPC .... G02B 21/0092; G02B 21/26; G02B 21/14; G02B 21/367; G01N 21/255; G01N 21/453; G01N 2021/1785; G01N 2021/214; G01N 2021/4186; G01N 2021/4792; G01N 2021/1736

See application file for complete search history.

(56) References Cited

U.S. PATENT DOCUMENTS

| | | | |
|---|---|---|---|
| 2008/0032325 A1* | 2/2008 | DiMarzio | G02B 21/18 359/368 |
| 2018/0031470 A1* | 2/2018 | Levinski | G01B 11/2536 |
| 2019/0235224 A1* | 8/2019 | Small | G02B 21/367 |

* cited by examiner

*Primary Examiner* — Mustak Choudhury

(57) ABSTRACT

A microscope, a method, and a system are provided. A system includes a first optical system, a second optical system, and one or more processors. The first optical system is configured to generate an optical phase signal associated with a first image of a sample in a first field of view. The second optical system is configured to generate a polarized signal associated with a second image of the sample in a second field of view. The one or more processors is configured to generate a co-registered phase and polarization information map based on the optical phase signal and the polarized signal. The first field of view is the same as the second field of view. The first image and the second image are captured sequentially.

19 Claims, 17 Drawing Sheets

C

D

ΔΓ = 136.4±0.6 nm

Δθ = 127.7°±0.9°

APPARATUS, OPTICAL SYSTEM, AND METHOD FOR DIGITAL HOLOGRAPHIC AND POLARIZATION MICROSCOPY

CROSS-REFERENCE TO RELATED APPLICATIONS

This application claims the benefit of priority from U.S. Provisional Application No. 63/292,575 filed Dec. 22, 2021 the entire contents of which are incorporated herein by reference.

GOVERNMENT RIGHTS

This invention was made with government support under R03EB28017 awarded by National Institutes of Health. The government has certain rights in the invention.

BACKGROUND

Optical signals endogenous to cells, tissues, and biomaterials allow non-invasive imaging of biological specimens without the disruption caused by various cell and molecular labeling methods. Endogenous optical signals arise from the biochemistry, nano-, and microstructure of imaged biospecimens, and include autofluorescence, infrared, and Raman spectral signals, single photon elastic scattering, second harmonic generation, optical phase, and birefringence signals. Endogenous signals often have multiple dependencies on specimen properties. For example, birefringence relates to intra-molecular bond polarizability and also inter-molecular organization, through form and intrinsic components, respectively. In contrast, optical phase height signals depend on specimen thickness and the index of refraction along the path of light projected through the specimen and imaged at each pixel. Microscopy using endogenous optical signals is label-free, and thus is less likely to perturb living cells or labile ultrastructural features of imaged biospecimens.

Optical phase and birefringence are two label-free signals endogenous to many biospecimens, comparison of which in biospecimens is highly informative. Local solid-phase density scales directly with both signals due to the direct effect of material density on index of refraction mismatch with water in hydrated specimens. Optical pathlength and optical retardance also both scale with specimen thickness. On the other hand, uniaxial birefringence is sensitive to intra- and inter-molecular orientation creating a fast and slow axis with different indices of refraction.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to a dual modality quantitative phase and polarized light microscope.

A system includes a first optical system, a second optical system, and one or more processors. The first optical system is configured to generate an optical phase signal associated with a first image of a sample in a first field of view. The second optical system is configured to generate a polarized signal associated with a second image of the sample in a second field of view. The one or more processors is configured to generate a co-registered phase and polarization information map based on the optical phase signal and the polarized signal. The first field of view is the same as the second field of view. The first image and the second image are captured sequentially.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
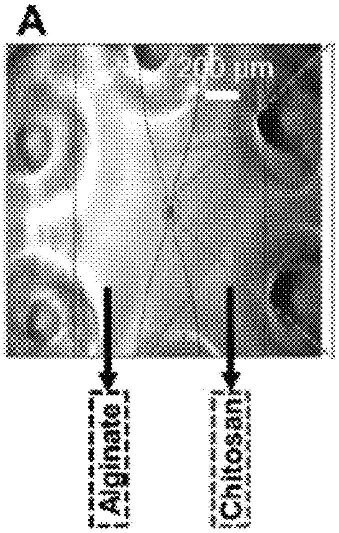
FIGS. 1A-1E are schematics that show microfluidic electrofabrication steps of a chitosan membrane, according to one aspect of the present disclosure.

Referring now to the drawings, wherein like reference numerals designate identical or corresponding parts throughout several views, the following description relates to a microscope, an optical system and associated methodology for digital holographic and polarization microscopy. The apparatus, optical systems, and methods described herein may be used for imaging biomedical specimens, including cells and tissue components. Polarized light and optical phase signals are fundamentally independent but are endogenous to many biospecimens, that produce both signals. Imaging both signals in the same field-of-view is particularly useful for imaging cells in extracellular matrix material or other biomaterials. Optical phase signals relate to cell morphology and subcellular structure. Polarized light signals relate to nanoscale organization and microstructure of aligned macromolecules in the cells and/or around the cells.

Optical retardance is proportional to birefringence (the refractive index difference parallel versus perpendicular to the optical axis) times the sample thickness. Optical phase signals without polarization selectivity are insensitive to the orientation dependence of the index of refraction. The origins of these two signals suggest that they will co-occur in many specimens with double refraction but will also have independent components, making them attractive signals for dual-modality imaging. Indeed, several reports describe dual-modality instruments that image both optical phase and birefringence. Many such current instruments either utilize tomography (rather than microscopy); or use a single illumination source, which is problematic for imaging turbid biospecimens, as explained in the rationale for this study below.

Tissue remodeling involves reciprocal interactions between cells and extracellular matrix that drive several important pathologies as well as normal tissue development and repair. For example, articular cartilage degeneration, atherosclerosis and cancer all feature extensive remodeling of the extracellular matrix (ECM) associated with upregulation of inflammatory cytokines and proteolytic enzymes. On one hand, autocrine and paracrine signals in remodeling often lead to cycles of impaired tissue homeostasis with progressive remodeling, loss of healthy tissue mechanical properties, and loss of function. On the other hand, remodeling of the wound bed by fibroblasts and other resident and recruited cells is essential to wound healing. In both normal and pathophysiological processes, local ECM density and orientation may drive interactions with cells, leading to effects such as cell spreading, stress fiber formation, durotaxis (migration along a gradient of tissue stiffness), and contact guidance in which cells orient and move along locally aligned ECM microstructure.

Chitosan is a versatile biomaterial that possesses both optical phase and birefringence signals, with its molecular organization influenced by various biofabrication conditions. In microfluidic devices, chitosan membranes have been assembled into freestanding films by flow: passing a connecting aperture between two adjacent microchannels allowing the free diffusion of hydroxyl ions to neutralize chitosan chains. The optical retardance of the film trends from high on the source side of hydroxyl ions to low on the film-growing side, while fluorescent signal from labeled chitosan is constant across this profile. Alternatively, chitosan films assembled on proximal side wall cathodes or across a pore between microchannels leading to distal cathodes also possess birefringence, and thus some degree of orientation, possibly due to preferential alignment of chitosan chains along a voltage gradient. Researchers are currently exploring chitosan films in microfluidics for various applications, including molecular sieves, gradient generation, electrode-gel interfaces, and construction of tissues on chips.

Turbid biospecimens with complex microarchitecture are challenging to image with a bimodal digital holographic microscopy (DHM) combined with traditional polarization microscopy. Laser speckle patterns manageable during phase reconstruction tend to drastically reduce contrast in the polarization channel. Further, birefringence contributes to optical phase signal, so that optical phase maps depend on local optical axis orientation with respect to the laser polarization of a single linear polarized laser illumination source that was used to collect both channels. Finally, manual or motorized rotation of polarization elements is laborious, slow, and introduces further measurement errors.

Described herein is a system and method for generating highly accurate and independent optical phase and birefringence parameter maps of turbid biospecimens from a bimodal DHM and quantitative polarization microscope. This is achieved by using two independent light sources, one coherent and one incoherent for phase and birefringence channels, respectively; and voltage-controlled liquid crystal variable retarders for fast and sensitive acquisition of polarization images.

The resulting bimodal instrument allowed direct comparison of the optical phase and birefringence parameters in cell-seeded collagen constructs and electrodeposited chitosan films. In the former case, the morphology of adherent cells detected by the optical phase height should be parallel to the direction of underlying collagen network alignment, detected by polarized light imaging. In the latter case, comparison of optical phase and birefringence signals in chitosan membranes reveals information relevant to the fabrication conditions and molecular organization. The DHM is a custom-built existing off-axis, bi-telecentric design with a Mach-Zender interferometer configuration. The two channels are collected sequentially but rapidly by means of a flip stage placing the illumination and polarization state generator into/out of the imaging path. Separate calibration of DHM and polarization channels is followed by co-registration using a printed phase target. Chitosan films fabricated in microfluidic channels and cell-seeded collagen tissue constructs are imaged with the dual-modality instrument and separately, with a conventional quantitative polarized light microscope using conventional acquisition techniques to determine optical retardance and orientation maps. Results demonstrate the accuracy of the dual holographic and polarization microscope, and the sensitivity to chitosan molecular organization in microfluidic biofabrication platforms and to cells and collagen microstructure within in vitro tissue constructs. Turbid specimens found to interact with laser speckle to produce non-uniform polarization backgrounds that produced errors in polarization parameter maps. This problem is eliminated by using an incoherent illumination source for the polarization channel. Therefore, the bimodal imaging system described herein is particularly well-suited for mapping optical phase and polarization parameters from turbid specimens with complex microarchitectures.

Materials and Methods

An immortalized human gingival fibroblast cell line (HGF, T0026, Applied Biological Materials, Inc.) was cultured on tissue treated polystyrene dishes, in standard tissue culture conditions of 37 °C, 5% CO2, and 100% humidity (HERAcell 150i, Thermo Fisher Scientific, MA, USA). Cells were fed with Prigrow III Medium (Applied Biological Materials Inc, BC, Canada) containing 10% fetal bovine serum (Corning, NY, USA) and a 1% solution of antibiotics (Penicillin-Streptomycin, Corning, NY, USA). Cells were fed every two days and split when reaching confluency, using trypsin.

In some aspects, the collagen was prepared as follows. Rat tail type 1 collagen hydrogels at 4 mg/ml were prepared from 8.15 and 10.21 mg/ml stock solutions (#354249, Corning, NY, USA). Stock collagen was mixed with 10× phosphate buffered saline (PBS) (Sigma-Aldrich, St. Louis, MO) to bring the PBS concentration to 1×. The PBS contained phenol red to assess the pH. A balance of double-distilled deionized (D.I.) water was added to the mixture. The solution was titrated with 0.1 M sodium hydroxide to a pH of 7.4-7.6, shifting the color from yellow to light red. The pH-adjusted collagen solution was then added to glass-bottomed Petri dishes (Cellvis, Mountain View, CA) to cover the glass surface. A micropipette was set to 2 μl and used to create 4-5 air bubbles in the collagen solution. Collagen-containing Petri dishes were gently wrapped with parafilm to avoid evaporation and left to self-assemble inside the incubator for 30 minutes at 37 °C. Then, 25,000 fibroblasts were seeded onto the surface of the gel, allowed to adhere for 1 hour, and finally, nutrient media was added before culturing the constructs for 24-48 hours.

A 0.5% w/v alginate solution was prepared by dissolving medium-viscosity sodium alginate powder extracted from brown algae (Sigma-Aldrich, St. Louis, MO) in D.I. water and stirred overnight. The alginate solution was adjusted to pH 6.0 for chitosan membrane electrofabrication. The 0.5% w/v chitosan solution was prepared by dissolving 85% deacetylated, medium molecular weight chitosan flakes (Sigma-Aldrich, St. Louis, MO) in D.I. water, titrated with 1M hydrochloric acid dropwise to pH 2 and left stirring overnight. Sodium hydroxide at 1M was then added dropwise to the solution to adjust the pH to 5.5. D.I. water was added to bring the chitosan solution to its final concentration of 0.5% w/v. The resulting chitosan solution was then filtered through a funnel with pore size of 170-220 μm and used for chitosan membrane electrofabrication.

Figure 1B:
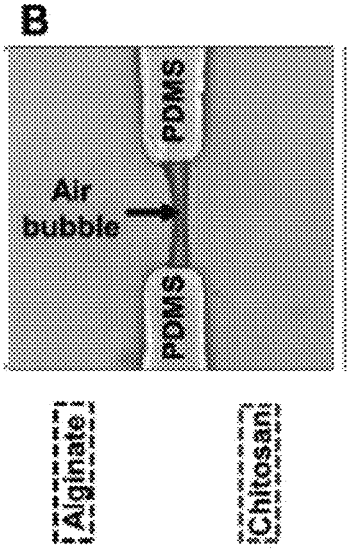
Figure 1C:
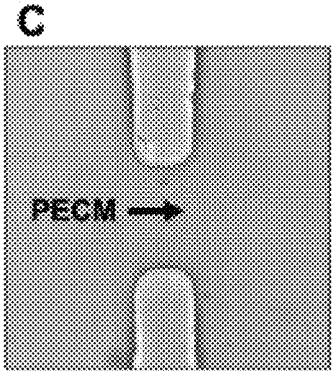
Figure 1D:
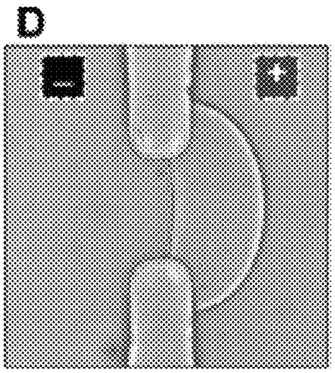
Figure 1E:
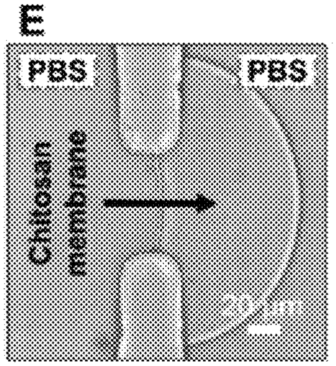

FIGS. 1A-1E are schematics that shows microfluidic electrofabrication steps of a chitosan membrane with distal electrodes, according to one aspect of the present disclosure. FIG. 1A shows a micrograph of the microchannels filled with alginate (0.5% w/v, pH=6.0) and chitosan (0.5% w/v, pH=5-5.5) solutions under an add-on vacuuming chamber. FIG. 1B shows an air bubble trapped inside the aperture between microchannels due to hydrophobicity of the PDMS device. FIG. 1C shows a thin polyelectrolyte complex membrane (PECM) instantaneously formed due to interaction between carboxyl groups of alginate and amine groups of chitosan. FIG. 1D shows an insoluble chitosan membrane grown upon the PECM due to a flux of $OH^-$ driven by an applied electrical field through distal electrodes, triggering the deposition of chitosan. FIG. 1E shows the final chitosan membrane after rinsing with phosphate buffer saline. Scale bars in the exemplary schematics are: 200 μm in FIG. 1A and 20 μm in FIGS. 1B-1E.

Chitosan membranes were fabricated in microfluidic devices comprised of poly(dimethylsiloxane) (PDMS) microchannels. The microchannels were bonded to a cleaned glass slide using oxygen plasma. The device comprising two microchannels with two inputs and two outputs as shown in FIG. 1A. Two microchannels of 500 μm×40 μm in width and height were connected at a 60-μm-wide aperture. Two metal couplers 22 ga×8 mm (Instech Laboratories, Inc., Plymouth Meeting, PA), functioning as both capillary connectors and distal electrodes, were inserted into one terminal of each microchannel, while the other terminals of the microchannels were left open. Once chitosan and alginate solutions were introduced into the microchannels by syringe pumps (NE-1000, New Era Pump Systems, Inc., Farmingdale, NY) at the flow rate of 1 μL/min, an air bubble was naturally trapped in the aperture between the two solutions due to the hydrophobicity of PDMS as shown in FIG. 1A and FIG. 1B. The pumps were stopped, and the air bubble was then vacuumed out of the PDMS device with an add-on vacuuming chamber based on the gas permeable property of PDMS as shown in FIG. 1B. A polyelectrolyte complex membrane (PECM) was spontaneously formed upon the contact of the positively charged chitosan and negatively charged alginate solutions as shown in FIG. 1C. Next, a direct current of 60 $A/m^2$ from a power supply (2450 Keithley SourceMeter, Keithley Instruments, Cleveland, OH) was applied through the distal electrodes allowing chitosan membrane growth on the PECM over time as shown in FIG. 1D-E. All membranes in microchannels were electrofabricated within 10 min, manually rinsed with PBS, and stored at 4 °C prior to imaging.

Figure 2A:
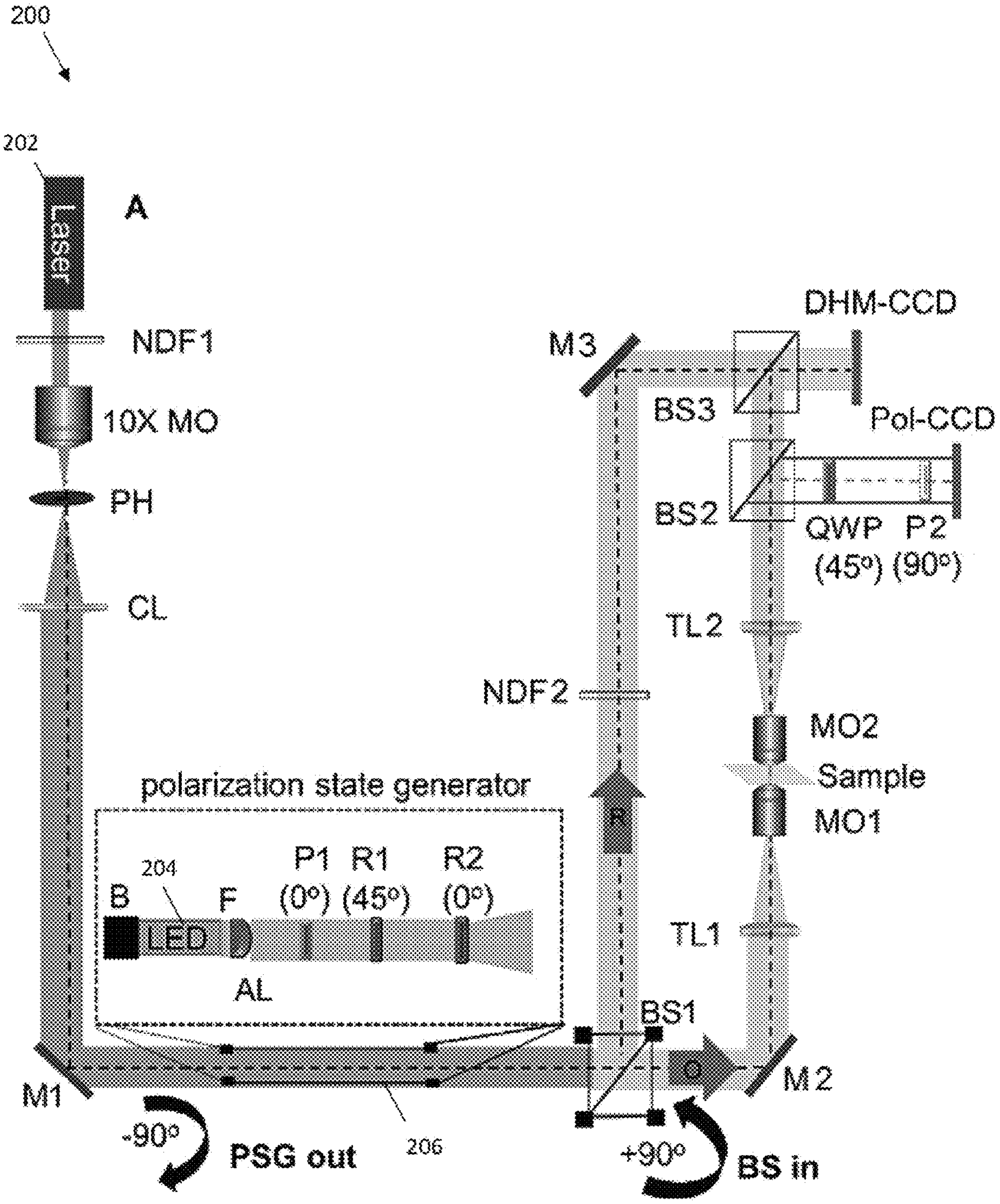
FIGS. 2A-2B are schematics that show a dual DHM-Polarization modular system, according to one aspect of the present disclosure.
Figure 2B:
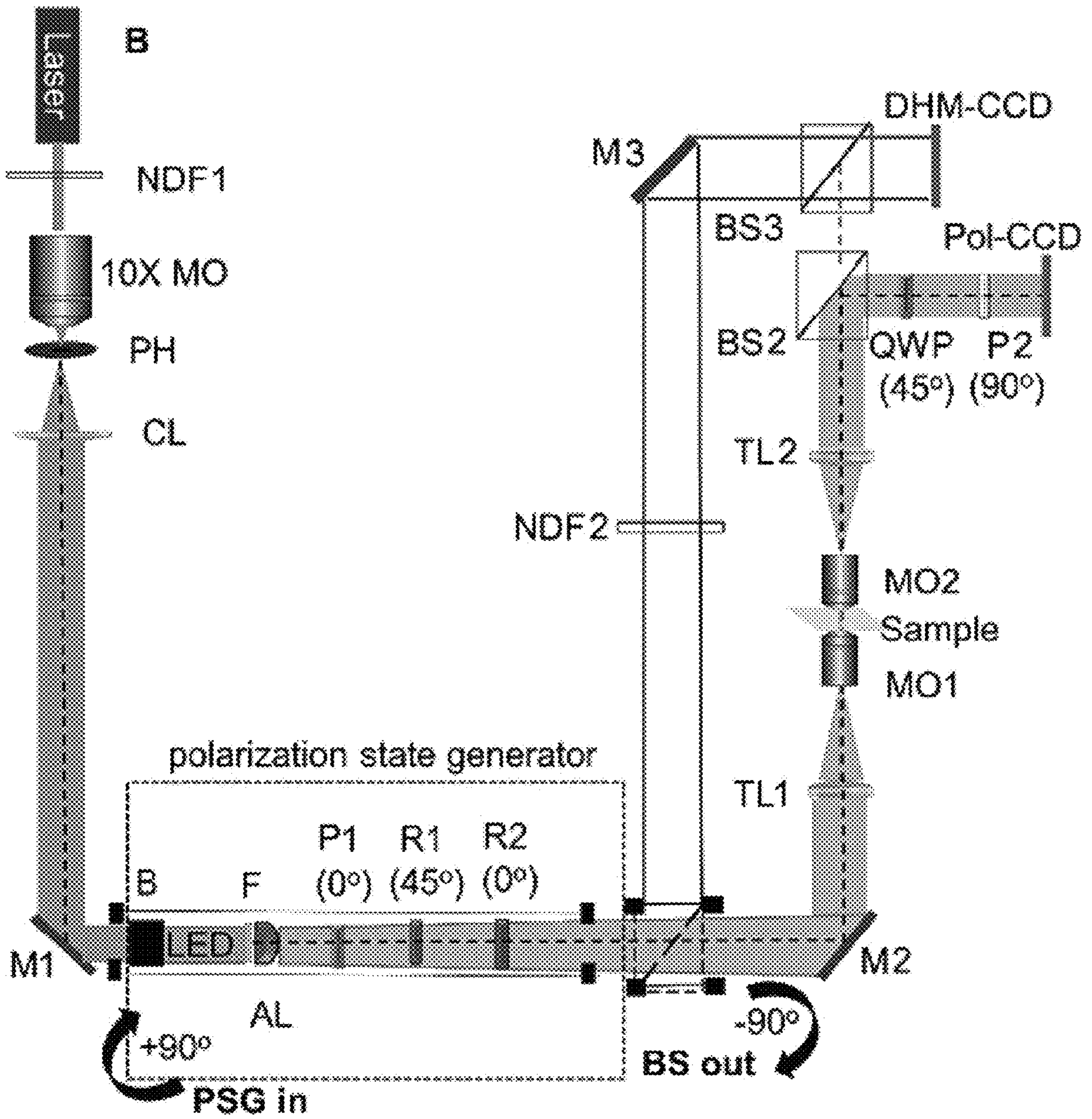

FIGS. 2A-2B are schematics that show a dual DHM-Polarization modular system 200, according to one aspect of the present disclosure. FIG. 2A shows the dual DHM-Polarization modular system when the DHM channel is in use and FIG. 2B shows the dual DHM-Polarization modular system when the polarization channel is in use.

The system 200 comprises a first illumination source 202, a second illumination source 204, a first neutral density filter NDF1, a collimating lens CL, one or more mirrors M1, M2, M3, a pin hole PH, a first microscopy objective MO1, a second microscopy objective MO2, a first polarizer P1, a second polarizer P2, a filter F, an aspheric lens AL, a first tube lens TL1, a second tube lens TL2, a quarter wave plate QWP, a light block B, a first beam splitter BS1, a second beam splitter BS2, a third beam splitter BS3, a polarization state generator PSG, a first imaging device DHM-CCD, a second imaging device Pol-CCD, a first linear polarizer P1, a second linear polarizer P2, a first retarder R1, a second retarder R2, and a movable stage 206.

System 200 may comprise two optical systems. A first optical system is configured to generate an optical phase signal associated with a sample in a first field of view. A second optical system is configured to generate a polarized signal associated with the sample. In some embodiments, system 200 is used to collect digital holograms and derive reconstructed phase maps. DHM lateral resolution was 1.2 μm with a 0.18×0.18 μm pixel dimensions for lateral reconstruction. In some embodiments, the first illumination source 202 is a laser. For example, a 633 nm HeNe laser is used to generate objective and reference beams. Interference patterns created by these two beams recombined at the beam splitter BS3 were imaged by the first imaging device (DHM-CCD). In one example, the first imaging device (DHM-CCD) is a 1.3 MP CMOS camera (Lumenera Corporation, Inc., Ontario, Canada), with the reference arm angled slightly by one mirror to produce an off-axis hologram. Phase height map reconstruction may be done using principal component analysis (PCA) to cancel the main hologram aberrations, while Zernike polynomial surface fitting was applied to cancel high-order aberrations. The refractive index difference (Δn) used to reconstruct phase height maps for chitosan membrane and a cell-collagen sample was 0.0189 and 0.044, respectively. Phase height map images are reconstructed using a simulation tool (e.g., MATLAB®) as would be understood by one of ordinary skill in the art.

In conventional polarization channels, laser illumination propagates through the polarization elements and produces a non-uniform polarization background, leading to errors in polarization parameter maps. The system 200 described herein solves these problems by using an incoherent illumination source. The second illumination source 204 also ensures the complete independence of phase and polarization signals. The polarization channel (or path) comprises a polarization state generator, a condenser, microscopy objectives MO1, MO2, a left-circular analyzer and the second imaging device Pol-CCD. The polarization state generator comprises the second illumination source 204 (e.g., a mounted LED source), the filter F (e.g., a 547 nm green interference filter), the aspheric lens AL, the first polarizer P1, the first retarder R1, and the second retarder R2. In some aspects, the first retarder R1 and the second retarder R2 are liquid crystal variable retarders. Microscopy objectives MO1 and MO2 may be 10× and 20× Plan Fluor objectives (Nikon) with a high level of correction for chromatic aberration, to reduce errors between the polarization channel, centered at 547 nm, and the DHM channel at 633 nm. The illumination-side optics may be installed into a cage system attached on a 90° flip mount that allowed repeated switching between DHM and polarization illumination/detection setups. The first linear polarizer P1 is set at 45° with respect to the slow axis of the first retarder R1, itself aligned at 45° with respect to the slow axis of the second retarder R2. The left-circular analyzer comprises the quarter wave plate QWP and the second linear polarizer P2 parallel to the generating retarder R2 and polarizer principal axes. The second imaging device Pol-CCD may be a 1.3 MP thermo-electrically cooled CCD (e.g., Infinity 3-1, Lumenera Corporation®). Polarization maps were compared to those computed from images collected on a commercial polarized light microscope (e.g., MT 9950, Meiji Techno Inc.). Polarization filters may be rotated with angular readouts from a Vernier scale, with resolution of 2°. For a given pixel, retardance and azimuth are derived from a local minimum intensity (extinction) recorded across a series of images acquired using the Senarmont technique adapted for digital analysis and the azimuth determining technique, respectively. Images were scaled to the same size by imaging a micrometer slide and measuring pin/pixel. For clarity, background within the microfluidic channel was segmented and removed from azimuth maps obtained with both the Meiji and polarization system, while background in the retardance parameter maps was retained. Image segmentation was performed manually using an imaging tool (e.g., ImageJ® version 1.53 c.).

In some embodiments, both digital holographic and polarization microscopes (digital channel and polarization channel) can be packaged onto the same platform, operated as a standalone instrument. It may also be possible to implement the system described herein as an independent module that can be added to an existing microscope platform. For example, with one component attached to a camera mount and a dual illuminator plus polarization state generator added through an illumination port. Such an existing platform may have an inverted microscopy set-up with the objective beneath a sample stage, and another objective above the sample stage, where the condenser is typically located.

In some embodiments, both modalities could be converted to detect optical signals in reflection.

In some embodiments, the first illumination source can generate a plurality of wavelengths. In some embodiments, the second illumination source can generate a plurality of wavelengths.

In some embodiments, both modalities may be used to measure signal characteristics in three-dimensions (tomography and planar imaging but with 3-D orientation of birefringence axes).

A specimen is considered to have retardance magnitude R and slow axis azimuth $\phi$ distributed in the Cartesian coordinate x-y plane, termed the specimen plane. Using the instrument described above, retardance values up to $\pi$ radians (273.5 nm for a 547 nm wavelength source) and azimuth values from 0° to 180° can be measured. Birefringence maps are calculated from intensity values of images collected under different voltage settings applied to liquid crystal variable retarders in the polarization state generator. This approach is rapid (seconds) and requires no moving parts during acquisition.

Elliptical polarization states are generated by the pair of LCVRs R1 and R2 (e.g., LCC1423-A, Thorlabs®) which alter linearly polarized light passing through a fixed polarizer. The slow axes of R1 and R2 are aligned at 45° and 0° with respect to the principal axis of the linear polarizer P. A Jones vector represents light polarization after passing through the two retarders is:

$$E = \begin{pmatrix} \cos\frac{\alpha}{2}\exp\left(-i\frac{\beta}{2}\right) \\ -i\sin\frac{\alpha}{2}\exp\left(i\frac{\beta}{2}\right) \end{pmatrix} \quad \text{Eq. 1}$$

where $\alpha$ and $\beta$ refer to the retardance of LC-A and LC-B, respectively, at given voltage settings. The final intensity, transmitted through the specimen, quarter waveplate, linear analyzer, and recorded at the camera, I($\alpha$, $\beta$, x, y), can then be derived as:

$$I(\alpha, \beta, x, y) = \frac{1}{2}\tau(x, y)I_{max}(x, y)[1 + \sin\alpha\cos\beta\cos\Gamma(x, y) - \sin\alpha\sin\beta\cos 2\theta(x, y)\times\sin\Gamma(x, y) + \cos\alpha\sin 2\theta(x, y)\sin\Gamma(x, y)] + I_{min}(x, y) \quad \text{Eq. 2}$$

where $I_{max}$(x, y) is the illumination intensity distribution, $\tau$(x, y) is an isotropic attenuation factor due to the specimen, and $I_{min}$(x, y) is specimen background illumination. $\Gamma$(x, y) and $\theta$(x, y) are the desired retardance and azimuth maps, respectively.

Figure 3A:
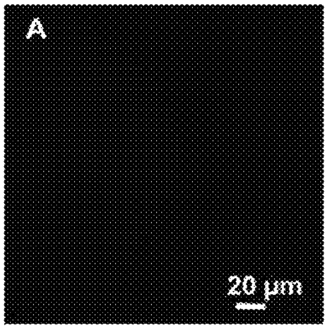
FIGS. 3A-3F are images that show five polarization settings of a glass-bottomed petri dish containing phosphate buffered saline, according to one aspect of the present disclosure.
Figure 3B:
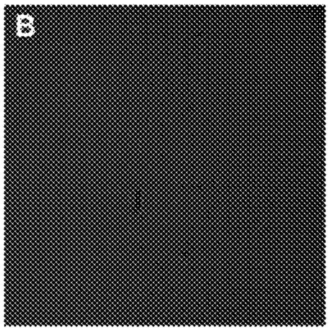
Figure 3C:
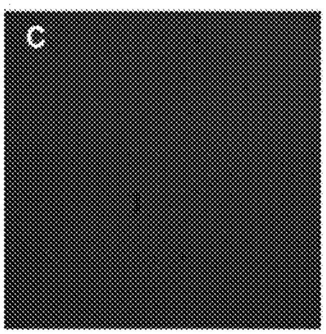
Figure 3D:
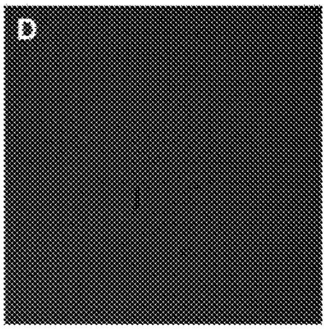
Figure 3E:
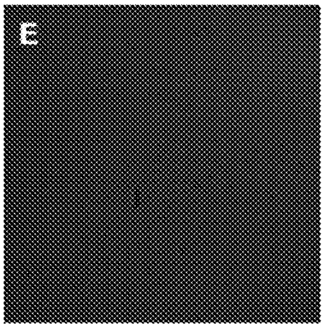
Figure 3F:
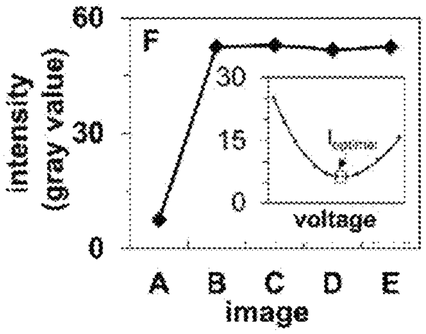

FIGS. 3A-3F are images that show five polarization settings of a glass-bottomed petri dish containing phosphate buffered saline, according to one aspect of the present disclosure. Calibration may be performed to determine LCVR voltage settings that provided good polarization inputs for robust retardance calculations, and to find retardance background. The calibration may be performed using software provided with LCVR controllers (LCC25, Thorlabs). Retardance values of the two LCVRs are slightly tuned by either increasing or decreasing applied voltages to achieve five desired settings ($\Sigma_1$, $\Sigma_2$, $\Sigma_3$, $\Sigma_4$, $\Sigma_5$; Table 1). The first setting or "extinction setting", $\Sigma_1$, was determined by initially setting $\alpha$=90° and $\beta$=180°. Then, $\alpha$ and $\beta$ were changed incrementally and intensities were recorded and assessed until a minimum intensity was reached. A swing retardance, $\chi$, was determined from previous experience with each specimen type (with larger $\chi$ for specimens with higher retardance) and applied in the next four polarization settings. The final four settings, if properly calibrated, should produce images with equal intensities as shown in FIG. 3. FIG. 3F shows the intensity values of the five images. The inset placed in the right corner of FIG. 3F depicts the optimal (minimal) intensity selected in setting 1. Images shown in FIG. 3A to 3E are used for background calculations as described previously herein.

TABLE 1

Retarder settings and polarization ellipse parameters for channel calibration.

| Images | | | Polarization ellipse | | |
|---|---|---|---|---|---|
| For Polarization Map Computation | LC-A Retardance (α) in degrees | LC-B Retardance (β) in degrees | γ major axis angle | ϵ auxiliary angle | Optimal Intensity (I), Background |
| $\Sigma_1$ | 90° | 180° | N/A | 45° | $I_1$ (minimum intensity) |
| $\Sigma_2$ | 90° + χ | 180° | 0° | 45° − χ/2 | $I_2$ ($I_2 >> I_1$) |
| $\Sigma_3$ | 90° | 180° + χ | 90° | 45° − χ/2 | $I_3 = I_2$ |
| $\Sigma_4$ | 90° | 180° − χ | 45° | 45° − χ/2 | $I_4 = I_2$ |
| $\Sigma_5$ | 90° − χ | 180 | 135° | 45° − χ/2 | $I_5 = I_2$ |

While the first setting created a right-circularly polarized beam (polarization ellipse auxiliary angle, ϵ=45°, the four other settings produced polarized beams of equal ellipticity (ϵ=45°-χ/2), distributed off longitudinal circles intersecting 4 of the 6 "poles" on the Poincaré sphere. A glass bottomed-petri dish containing 1×PBS was used as a blank sample for calibration and collecting background images. Subsequently, specimens were imaged included a zero-order quarter waveplate, a chitosan membrane fabricated in a polydimethylsiloxane channel and cell-seeded collagen gels (examples of raw polarization images are shown in FIGS. 4A-4F). The swing retardance was χ=90° for the QWP, χ=28.8° for chitosan membranes, and χ=14.4° for collagen constructs.

Figure 4A:
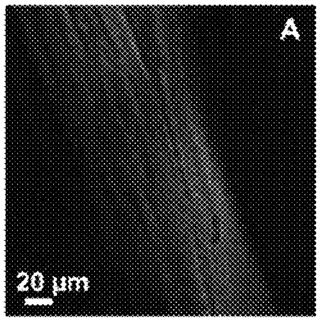
FIGS. 4A-4F are images that show a collagen-cell construct at five polarization settings, according to one aspect of the present disclosure.
Figure 4B:
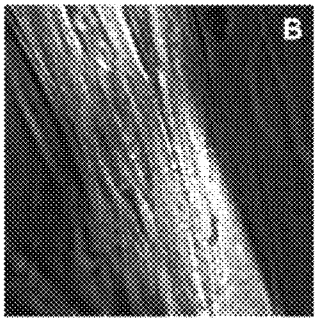
Figure 4C:
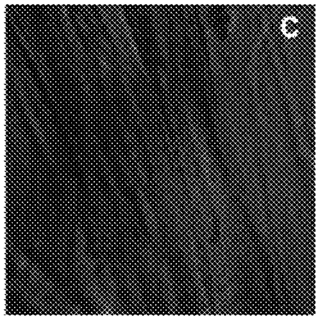
Figure 4D:
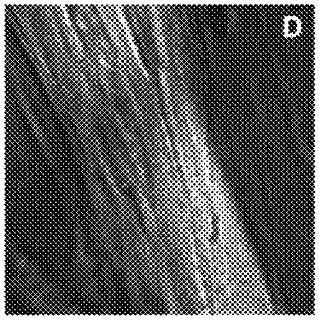
Figure 4E:
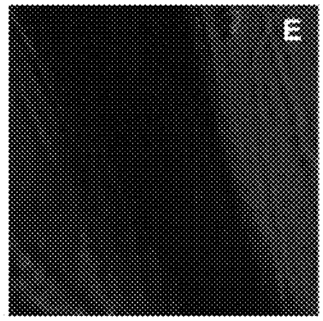
Figure 4F:
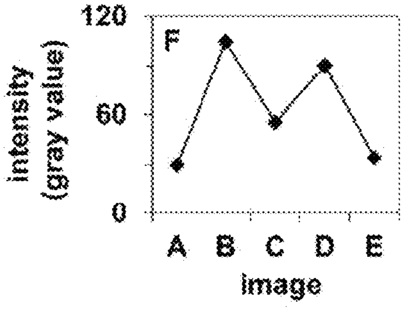

FIGS. 4A-4F are images that show a collagen-cell construct at five polarization settings, according to one aspect of the present disclosure. After calibration, the five voltage settings are repeated for imaging specimens. The intensity plot shown in FIG. 4F depicts whole image-averaged intensity for the images shown in FIGS. 4A-E.

Images recorded from setting 1 through setting 5 were processed for retardance and azimuth maps using the method of Oldenbourg and Shribak as would be understood by one of ordinary skill in the art. Subsequent image analysis can be performed using a digital imaging processing software (e.g., ImageJ®(Image) v1.53c, public domain license, BSD-2), MATLAB®, or the like).

Two intermediate results, A and B based on images $I_1$ to $I_5$ recorded at settings $\Sigma_1$ to $\Sigma_5$ were:

$$A = \frac{I_5 - I_2}{I_5 + I_2 - 2I_1} \cdot \tan\frac{\chi}{2} \quad \text{Eq. 3}$$

$$\text{and } B = \frac{I_3 - I_4}{I_3 + I_4 - 2I_1} \cdot \tan\frac{\chi}{2} \quad \text{Eq. 4}$$

Similarly, intermediate values $A_{bg}$ and $B_{bg}$ from background images were also calculated. Background correction was applied by subtracting background from specimen A and B variables. Retardance values, Γ, and azimuth, θ, were then calculated as:

$$\Gamma = \arctan\left[\sqrt{(A - A_{bg})^2 + (B - B_{bg})^2}\right], \quad \text{Eq. 5}$$

$$\text{or } \Gamma = 180 - \arctan\left[\sqrt{(A - A_{bg})^2 + (B - B_{bg})^2}\right], \quad \text{Eq. 6}$$

-continued $$\text{and } \theta = \frac{1}{2}\arctan\left(\frac{A - A_{bg}}{B - B_{bg}}\right), \quad \text{Eq. 7}$$

With Eq. 5 used when $I_2+I_3-2I_1 \geq 0$ and Eq. 6 used otherwise. For imaging the QWP, a modified four-setting algorithm was used, without the first extinction setting.

Exemplary Results

Figure 5A:
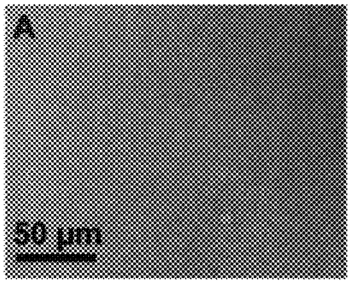
FIG. 5A is an image of a retardance map of a quarter wave plate, according to one aspect of the present disclosure.
Figure 5B:
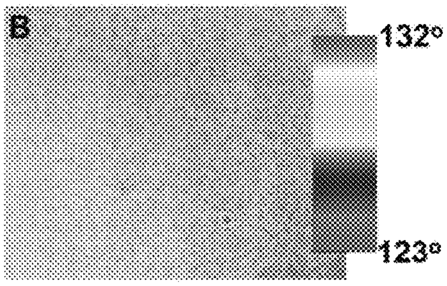
FIG. 5B is an image that shows an azimuth map of a quarter wave plate, according to one aspect of the present disclosure.

FIG. 5A is an image of a retardance map of a quarter wave plate from the polarization module, according to one aspect of the present disclosure and FIG. 5B is an image that shows an azimuth map of a quarter wave plate, according to one aspect of the present disclosure. Retardance (shown in FIG. 5A) and azimuth maps (FIG. 5B) of a quarter waveplate were uniform. The measured retardance was 136.4±0.6 nm (mean±SD), close to the nominal retardance of $$\frac{\lambda}{4} = 136.75 \text{ nm}.$$

The measured azimuth was 127.7±0.9°. The standard deviation of retardance (background variation) on the nominally smooth waveplate was 0.6 nm (FIG. 5A), in comparison to 37 nm on a nominally smooth, 350 nm phase height target (see Supplemental Fig. S2). The accuracy of the calculated retardance and phase maps were 99.8% (image average from one trial: 136.4 nm vs. 136.75 nm nominal) and 99.7% (one target measurement from three trials: 350.9 nm vs. 350 nm nominal), respectively. It should be noted that three successive calibrations over two weeks using the same quarter waveplate produced image-averaged measured retardance of 126.0±0.4 nm, 135.0±0.5 nm, and 136.4±0.6 nm, a trend reflecting the experimenter's proficiency with LCVR voltage control to best meet the criteria of Table 1, such as finding a truly minimum extinction image and subsequent background images of equal intensity. This progression in learning suggests the suitability of developing an auto-calibration procedure, in future work. The phase calibration slide was imaged three times with measured phase height of a target (the largest square in Fig. S2) 348.0±37 nm, 351.5±46 nm, and 353.2±23 nm.

FIGS. 6A-6D are images that show retardance (Γ, nm) map and azimuth map of a chitosan membrane collected by a polarization module and conventional polarization microscopes (Meiji polarization microscopes), according to one aspect of the present disclosure.

An electrofabricated chitosan membrane was used to test the polarization module sensitivity. After calibration, retardance and azimuth maps were generated and compared to maps of the same membrane derived from a polarized light microscope using the "Sérnamont" technique updated to use digital image data and an azimuth-detecting technique as would be understood by one of the skill in the art. Average±standard deviation retardance values are printed in the Polarization module retardance map shown in FIG. 6A and Meiji microscope retardance map shown in FIG. 6B. The "Sernamont" technique was used to compute maps the retardance shown in FIG. 6B, with an associated technique to calculate azimuth shown in FIG. 6D. Retardance maps were brightened to reveal spatial features. Scale bar of 50 μm is indicated.

Figure 6A:
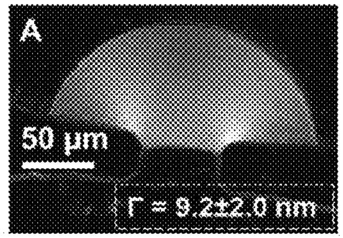
FIGS. 6A-6D are images that show retardance map and azimuth map of a chitosan membrane collected by a polarization module and polarization microscopes, according to one aspect of the present disclosure.
Figure 6B:
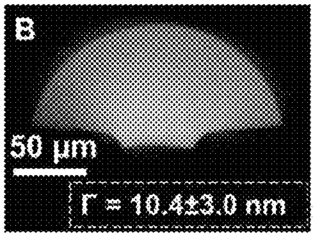
Figure 6C:
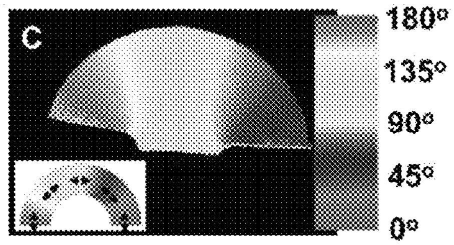
Figure 6D:
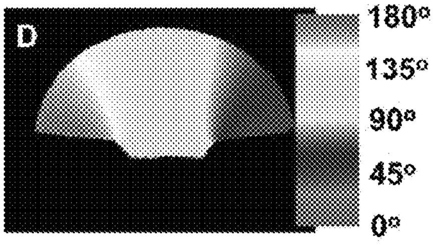

Whole-membrane averaged retardance values were 9.2±2.0 nm and 10.4±3.0 nm for the imaging module and microscope, respectively. The slow axis of the chitosan membranes ranged continuously through 140°, consistent using both imaging systems (as shown in FIGS. 6C-6D). Small differences between retardance and azimuth maps computed using data from the two systems may arise from small errors in calibration of either system. The two bright spots in FIG. 6A may be related to errors in LCVR voltage settings for the polarization module. Differences in azimuth may relate to errors in optical axis alignment of polarization elements in either system. Further fine tuning of the polarization module calibration may require imaging of a precise birefringence standard such as an optical fiber, and/or simulation of error propagation from raw images to computed parameter maps. In some implementations, fine tuning may be used in the system.

FIGS. 7A-7E are images that show retardance map and azimuth map of a chitosan membrane collected by the dual DHM-Polarization modular system, according to one aspect of the present disclosure.

Figure 7A:
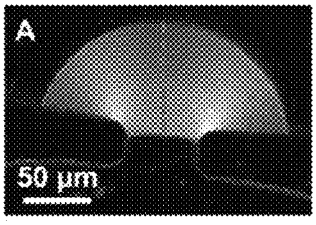
FIGS. 7A-7E are images that show retardance map and azimuth map of a chitosan membrane collected by the dual DHM-Polarization modular system, according to one aspect of the present disclosure.
Figure 7B:
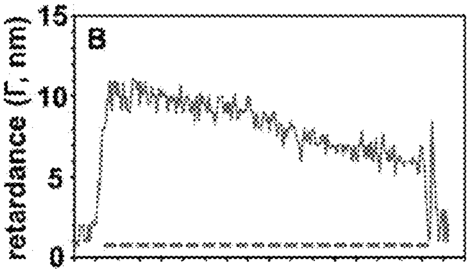
Figure 7C:
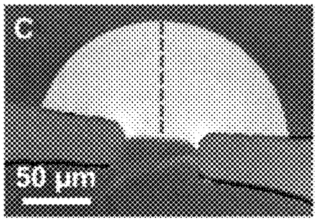
Figure 7D:
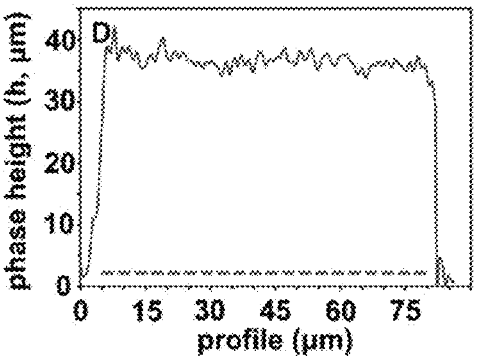
Figure 7E:
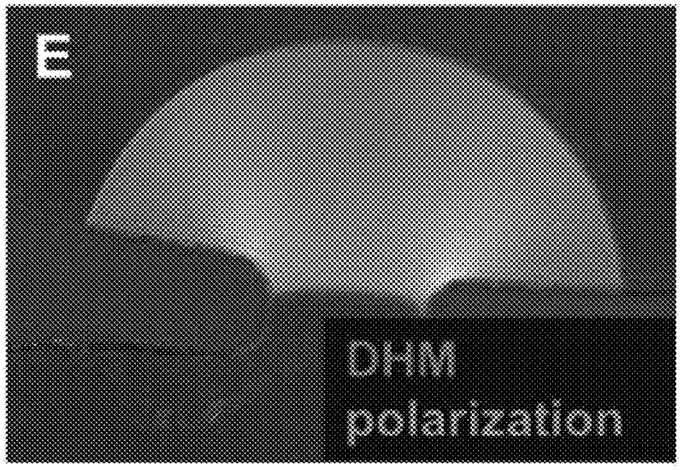

Phase and retardance images of a chitosan membrane were collected simultaneously by the dual DHM-Polarization microscope. The image of a chitosan membrane imaged by the polarization channel is shown in FIG. 7A. The image of the chitosan membrane imaged by the DHM channel is shown in FIG. 7C. A co-registered image map of the maps collected by the polarization channel and the DHM channel is shown in FIG. 7E in which separate channels represent phase height and retardance signals from DHM and Polarization modules, respectively. Plots in FIGS. 7B and 7D are retardance and phase height profiles indicated by the dashed lines in FIG. 7A and FIG. 7C. Scale bar is 50 μm in FIG. 7A and FIG. 7C.

Next, retardance and phase height maps from polarization and DHM channels were co-registered and compared using the same chitosan membrane. Profiles through the central portion of the membrane reveal retardance dropped from 11 to 7 nm from cathode to anode side of the membrane as shown in FIG. 7B, but optical phase height remained constant at around 38 μm (close to the nominal channel height of 40 μm) (as shown in FIG. 7D). The gradient in retardance as well as two flares in retardance near the aperture edges are apparent in an overlay of retardance and phase height maps (as shown in FIG. 7E). These results demonstrate that the exact same location of an electrofabricated chitosan membrane can be sequentially imaged with the newly developed dual DHM-polarization microscope. The obtained data about specimen phase and retardance together demonstrate that, although the phase height across the entire membrane was uniform, the molecular alignment within the membrane was uneven, presumably a result of the nonuniform potential gradient generated around the aperture area.

Figure 8A:
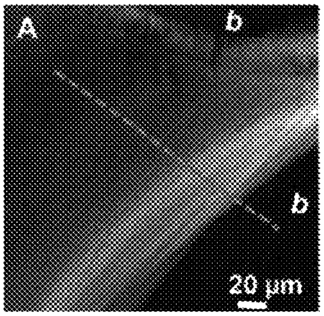
FIGS. 8A-8E are images that show phase and retardance of a collagen-cell sample, according to one aspect of the present disclosure.
Figure 8B:
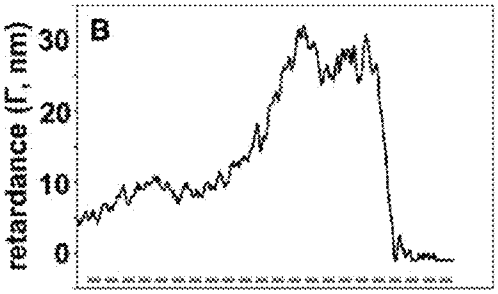
Figure 8C:
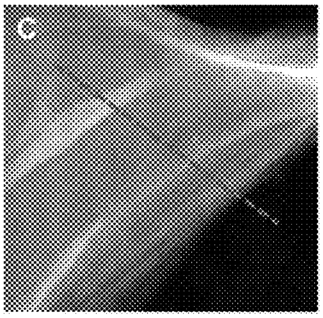
Figure 8D:
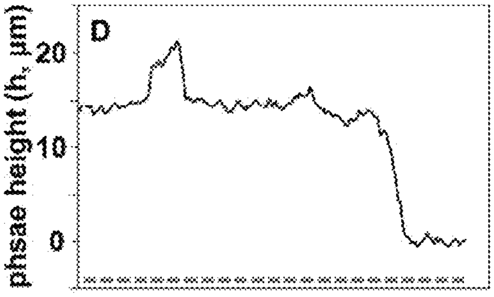
Figure 8E:
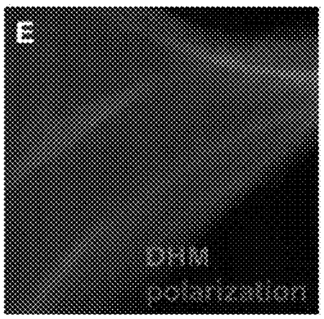

FIGS. 8A-8E are images that show phase and retardance of a collagen-cell sample, according to one aspect of the present disclosure. Images of the collagen region lying between two bubbles containing several HGF cells are imaged by the polarization channel and the DHM channel. Phase and retardance images of a collagen-cell sample are collected sequentially by the dual DHM-Polarization module set up. Collagen network microstructure was aligned tangentially to the edge of bubbles placed in collagen gels during self-assembly, apparent in retardance maps shown in FIG. 8A. The co-registered optical phase height map revealed fibroblasts with long axes aligned with collagen network microstructure is shown in FIG. 8C. The retardance shown in FIG. 8B and phase height profiles shown in FIG. 8D along co-registered maps revealed the fine structure of these two signals varied independently. Signal differences were apparent in the overlay shown in FIG. 8E. Scale bar is 50 μm in FIG. 8A. Locations where bubbles were present during self-assembly are indicated by the letter b.

Figure 9:
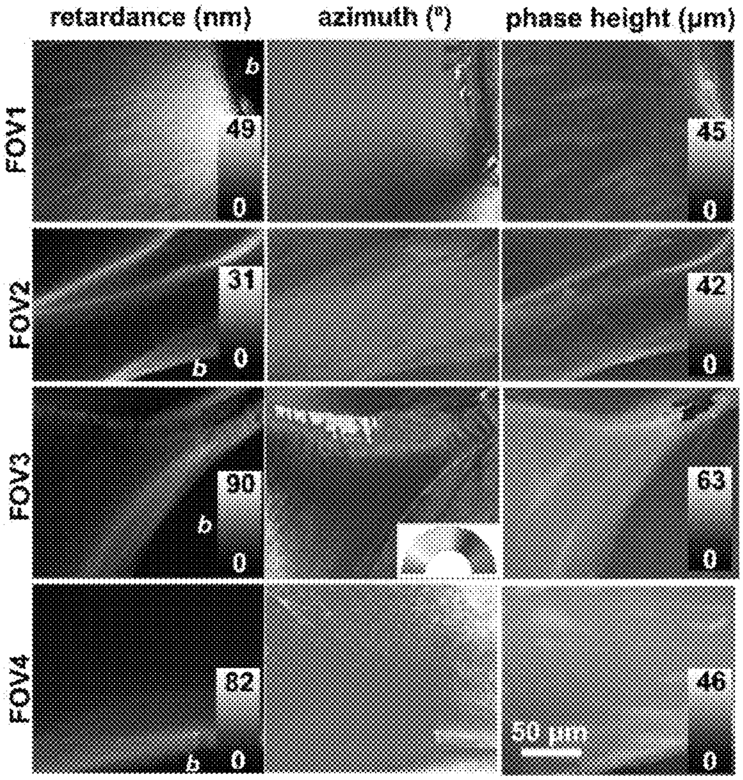
FIG. 9 is an image that shows co-registered retardance, azimuth, and phase height maps, according to one aspect of the present disclosure.
Figure 10A:
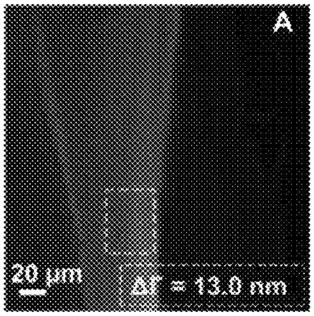
FIGS. 10A-10F ae images that shows retardance maps of collagen networks surrounding gaps at one time occupied by air bubbles, according to one aspect of the present disclosure.
Figure 10B:
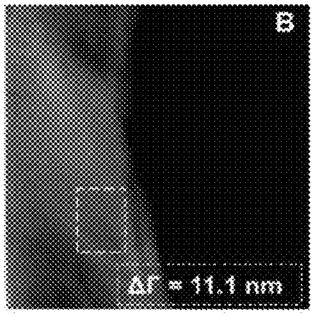
Figure 10C:
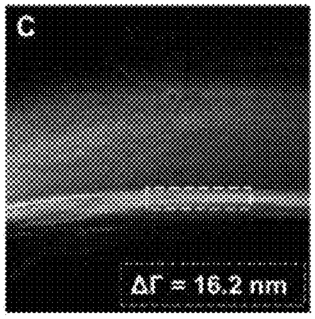
Figure 10D:
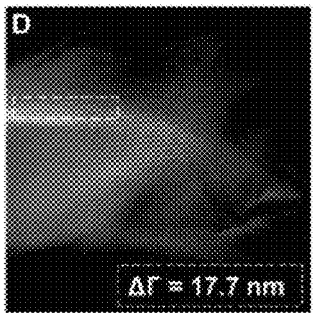
Figure 10E:
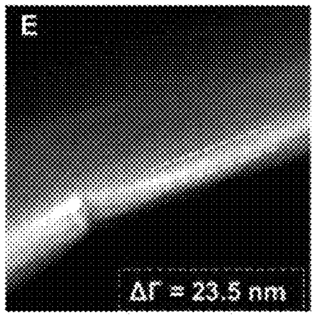
Figure 10F:
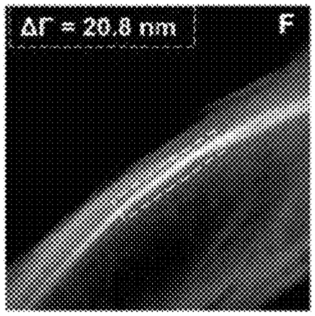

FIG. 9 is an image that shows co-registered retardance, azimuth, and phase height maps, according to one aspect of the present disclosure. Co-registered retardance, azimuth, and phase height maps from four additional fields of view (FOV1 to 4) fibroblast-seeded collagen gels. Collagen network alignment occurs near interfaces with air bubbles placed in the gel during self-assembly. Locations where bubbles were present during self-assembly are indicated by the letter b in FIG. 9.

FIGS. 10A-10F ae images that shows retardance maps of collagen networks surrounding the air bubbles, according to one aspect of the present disclosure. Similar but not co-registered structures from the same specimen were imaged as shown in FIGS. A and B, FIGS. C and D, and FIGS. E and F, using the polarization module (FIGS. A, C and E) and a Meiji polarized light microscope (FIGS. B, D and F). Average retardance values within the dashed boxes from each image are indicated. Retardance values from aligned collagen networks were similar from the polarization module of the DHM-polarization dual modality microscope and a standalone polarized light microscope. Due to co-registration of DHM and polarization channels cell morphology, revealed in phase maps, and collagen network microstructural organization, revealed in retardance and azimuth maps, are immediately relatable. Thus, the dual DHM-polarization microscope is well-suited to determine cell-extracellular matrix mechanical interactions in the context of motility, substrate adhesion, and tissue remodeling.

The dual-modality quantitative phase and polarization microscope described herein maps optical phase and birefringence signals in biological specimens, relating the signals and underlying microscale features to each other. Specifically, maps of optical phase height, retardance and local slow axis azimuth are generated. Polarization maps are successfully derived from several specimens with low and high birefringence signals. Retardance and azimuth maps are consistent across several specimens (chitosan and cell-seeded collagen) and two imaging systems (the polarization module and a polarized light microscope). Polarization parameter maps are computed with no manual manipulation of optical components, making the technique easy to perform by an untrained end-user. The HeNe laser and LED illumination sources produce low power at the imaging plane, a requirement for nondestructive analysis of living biospecimens. Due to the two light sources and sequential acquisition, DHM and polarization channels are completely independent of each other, with no channel cross-talk. Thus, the dual-modality imaging system enables label-free biospecimen imaging with intrinsic contrast for local optical anisotropy and optical pathlength.

Detection of chitosan optical properties is useful for applications of chitosan membranes as molecular sieves, microfluidic gradient generators, and synthetic biology interfaces. The molecular sieve activity of chitosan membranes was demonstrated by the passage of calcium ions but not macromolecules through chitosan membranes to fabricate collagen-alginate gels with spatial programmability. The data of FIG. 7, revealing a constant phase height matched with a high to low retardance from cathode to anode side of the membrane, constitute a novel finding in electrofabricated chitosan membranes. These data may indicate constant density but altered intra- and/or inter-molecular alignment from cathode to anode side of the membrane. Microfluidic flow-assembled chitosan membranes display a similar drop in retardance in the direction of membrane growth. Both parameters are effective and independent optical readouts for chitosan density and alignment, respectively. Aspects of chitosan membrane molecular organization and ultrastructure influence their properties, such as mechanical modulus and porosity, and their applications, such as gradient generators and as biological interfaces. The obtained phase and birefringence information may shed light on the chitosan membrane fabrication process. For example, these optical signals are related to the electrofabrication process by which distal electrodes electrically program chitosan molecular organization within the membrane. Furthermore, the molecular organizations of electrically-deposited and flow-assembled chitosan membranes are currently being investigated. Phase height is influenced by molecular packing density, while form and intrinsic birefringence are also sensitive to intra- and inter-molecular alignment of chitosan chains. Combined phase and birefringence imaging of chitosan membranes during microfluidic fabrication and subsequent modification may provide data to understand subtle ultrastructural shifts within such membranes, as occurs for example upon crosslinking. For these reasons, birefringence parameters from electrically and flow-assembled chitosan membranes are a topic of ongoing investigation.

Human gingival fibroblasts growing on collagen hydrogels exhibit contact guidance to align parallel with collagen network anisotropy, clearly visible in co-registered phase height and retardance maps, respectively (as shown in FIG. 9 and FIG. 10). It is important to note that optical retardance depends on specimen thickness and uniaxial index of refraction difference, the latter of which scales with both microstructural alignment and density. On the other hand, optical phase height depends on specimen thickness and index of refraction values projected through the specimen. The local index of refraction depends on local material composition and density/hydration. Therefore, a direct comparison of local gradients in phase and birefringence signals suggest a gradient in density when both match, and a gradient in alignment when the phase height gradient is absent or opposite in direction to the retardance gradient. In collagen gels, local retardance but not phase height was often high close to interfaces with bubbles placed during self-assembly and subsequently filled with media (as shown in FIG. 9 and FIG. 10). This suggests collagen network alignment occurred tangential to the bubble air-liquid interface during self-assembly, without a build-up in local collagen network density. Fibroblasts respond to local collagen network microstructure by alignment parallel to the microstructural long axis, consistent with contact guidance. These results suggest that the dual-modality DHM-polarization system described herein is well-suited to study of tissue microstructural remodeling in models of wound healing, fibrosis, in vitro tissue development, and the cancer microenvironment. The difficulty of finding and aligning the same field-of-view with two separate microscopes, within the larger tissue construct, demonstrates the advantage of the dual modality microscope.

The system described herein collects transmissive signals through thin, transparent tissue constructs, such as tissues and biomaterials in microfluidic chips, or cell-seeded transparent hydrogels. Other systems that record optical phase and birefringence are single-shot or directly relate the index of refraction mismatch to birefringence measurements, so that the optical phase difference may depend on local optical axis orientation and local birefringence signal. In contrast, the two illumination sources of the setup described herein 1) eliminate speckle noise from the polarization channel, while 2) allowing for the possibility of building polarization sensitivity into the DHM channel and 3) multi-wavelength imaging capability into both channels. Addition of acousto-optic tunable filters and automated shutters would eliminate the need to move the two flip stages between channel acquisitions. Alternatively, bandpass filters in front of the CCD sensors would allow simultaneous acquisition with minimal channel cross-talk. Optical depth sectioning in the phase and polarization channels would be possible through holographic and polarization-sensitive optical coherence tomography.

The DHM-polarization imaging system described herein non-invasively acquires label-free optical signals endogenous to cells, tissues, and biomaterials. Phase and birefringence channels produce fine structure contrast independently, aided by sequential acquisition and independent light sources. Molecular organization and specimen height ultimately govern optical phase and retardance signals, so comparison of co-localized signal features helps to elucidate spatial trends in these properties. This is particularly fruitful when interpreting cell-extracellular matrix interactions in cell-seeded hydrogel constructs. Compared to conventional phase and birefringence imaging systems, the system described herein is well-suited to image turbid specimens such as engineered tissue constructs and biofabricated membranes in microfluidics, contributing to further understanding of such complex biospecimens. Future applications of the imaging system include assessment of cancer invasion in a complex in vitro tumor microenvironmental model. This help identify dynamic cell migration interactions with ECM contributing to pathological progression of cancer, and potentially novel therapeutic interventions.

Figure 11:
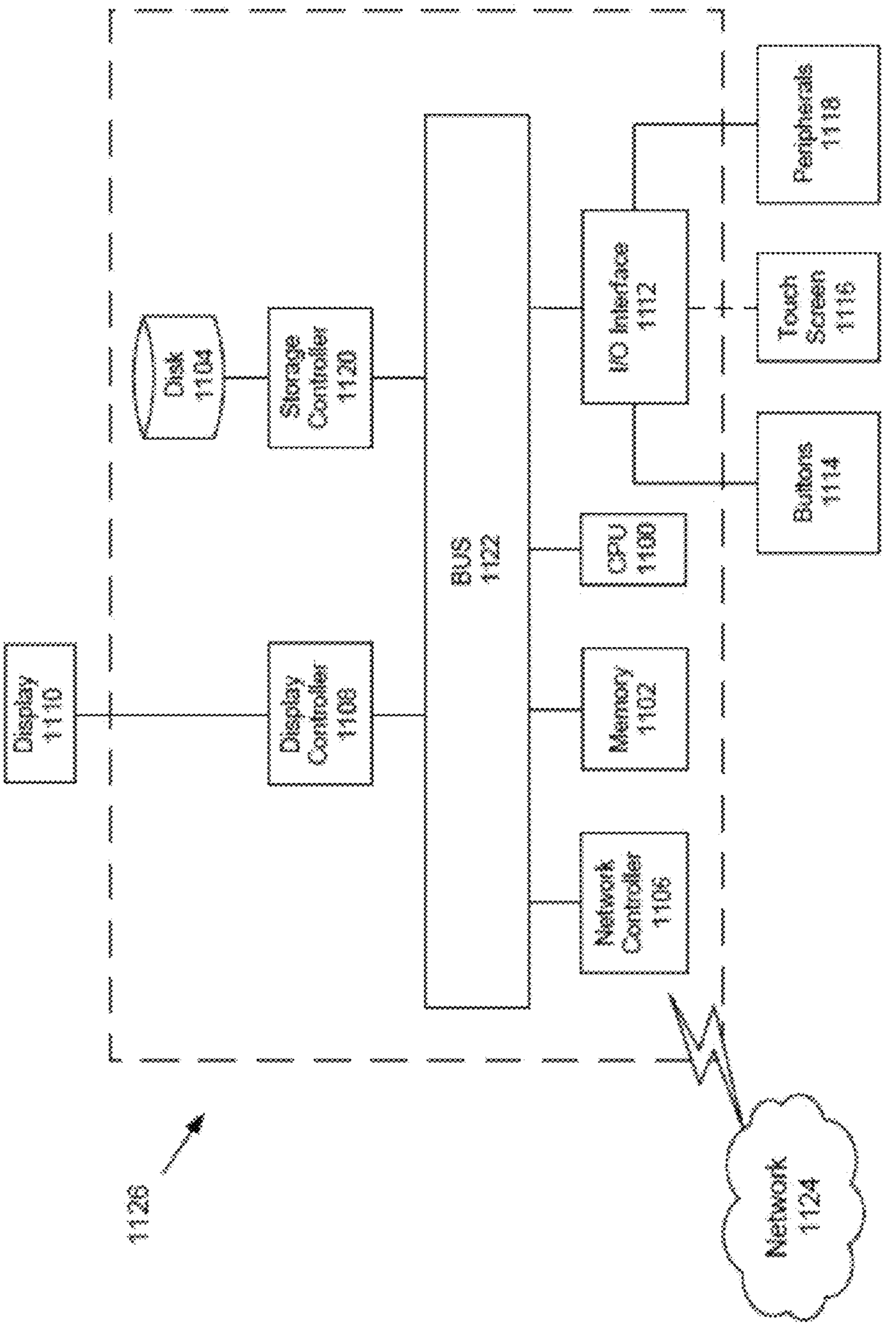
FIG. 11 is an exemplary block diagram of a computing device according to one example.

In one implementation, the functions and processes of the processor may be implemented by a computer 1126. Next, a hardware description of the computer 1126 according to exemplary embodiments is described with reference to FIG. 11. In FIG. 11, the computer 1126 includes a CPU 1100 which performs the processes described herein. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1126 communicates, such as a server or computer.

Further, the claimed advancements may be provided as a utility application, background daemon, or component of an operating system, or combination thereof, executing in conjunction with CPU 1100 and an operating system such as Microsoft® Windows®, UNIX®, Oracle® Solaris, LINUX®, Apple macOS® and other systems known to those skilled in the art.

In order to achieve the computer 1126, the hardware elements may be realized by various circuitry elements, known to those skilled in the art. For example, CPU 1100 may be a Xenon® or Core® processor from Intel Corporation of America or an Opteron® processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computer 1126 in FIG. 11 also includes a network controller 1106, such as an Intel Ethernet PRO network interface card from Intel Corporation of America, for interfacing with network 1124. As can be appreciated, the network 1124 can be a public network, such as the Internet, or a private network such as LAN or WAN network, or any combination thereof and can also include PSTN or ISDN sub-networks. The network 1124 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1126 further includes a display controller 1108, such as a NVIDIA® GeForce® GTX or Quadro® graphics adaptor from NVIDIA Corporation of America for interfacing with display 1110, such as a Hewlett Packard® HPL2445w LCD monitor. A general purpose I/O interface 1112 interfaces with a keyboard and/or mouse 1114 as well as an optional touch screen panel 1116 on or separate from display 1110. General purpose I/O interface also connects to a variety of peripherals 1118 including printers and scanners, such as an OfficeJet® or DeskJet® from Hewlett Packard®.

The general purpose storage controller 1120 connects the storage medium disk 1104 with communication bus 1122, which may be an ISA, EISA, VESA, PCI, or similar, for interconnecting all of the components of the computer 1126. A description of the general features and functionality of the display 1110, keyboard and/or mouse 1114, as well as the display controller 1108, storage controller 1120, network controller 1106, and general purpose I/O interface 1112 is omitted herein for brevity as these features are known.

The features of the present disclosure provide a multitude of improvements in the technical field of digital microscopy. In particular, the controller may remove aberrations from the collected samples. The methodology described herein could not be implemented by a human due to the sheer complexity of data, gathering and calculating and includes a variety of novel features and elements that result is significantly more than an abstract idea. The methodologies described herein are more robust to inaccuracies. The method described herein may be used for early cancer detection. Thus, the implementations described herein improve the functionality of a digital microscope by mitigating aberrations in the acquired images. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

A non-transitory computer readable medium storing computer-readable instructions therein which when executed by a computer cause the computer to perform a method, the method including illuminating a sample using a first illumination beam, detecting via a detector an interference of a scattered beam from the sample and a reference beam in a first field of view, generating an optical phase signal based on the detected interference, illuminating the sample using a second illumination beam, detecting via another detector another scattered beam from the sample in a second field of view, generating a polarized signal based on the another scattered beam, and generating a co-registered phase and polarization information map based on the optical phase signal and the polarized signal wherein the scattered light beam and the another scattered light beam are detected sequentially and wherein the second field of view is the same as the first field of view.

A microscope including a first illumination source configured to generate a first illumination beam, a second illumination source configured to generate a second illumination beam, an objective configured to focus the first illumination beam or the second illumination beam on a sample, a movable stage configured to alternate between a first position and a second position, wherein in the first position the first illumination beam illuminates the sample and in the second position the second illumination beam illuminates the sample, a first detection system configured to detect at least a first scattered light beam from the sample when the movable stage is in the first position, a second detection system configured to detect a second scattered light beam from the sample when the movable stage is in the second position, and a processor configured to generate an optical phase signal based on the at least first scattered light beam and a polarized signal based on the second scattered light beam.

The invention claimed is:

1. A system comprising:

a first optical system configured to generate an optical phase signal associated with a first image of a sample in a first field of view;

a second optical system configured to generate a polarized signal associated with a second image of the sample in a second field of view; and one or more processors configured to generate a co-registered phase and polarization information map based on the optical phase signal and the polarized signal, wherein the first field of view is the same as the second field of view and wherein the first image and the second image are captured sequentially, wherein the first optical system comprises:

a first illumination source configured to generate a first illumination beam, and a first detection system configured to detect at least a first scattered light beam from the sample and to generate the optical phase signal; and wherein the second optical system comprises:

a second illumination source configured to generate a second illumination beam, and a second detection system configured to detect a second scattered light beam from the sample and to generate the polarized signal.

2. The system of claim 1, further comprising:

an objective configured to focus the first illumination beam or the second illumination beam on the sample.

3. The system of claim 1, further comprising:

a movable stage configured to alternate between a first position and a second position, wherein in the first position the first illumination beam illuminates the sample and in the second position the second illumination beam illuminates the sample.

4. The system of claim 3, wherein the second illumination source is positioned on the movable stage.

5. The system of claim 1, wherein the first detection system is further configured to detect a reference beam.

6. The system of claim 1, wherein the first illumination source is a laser; and wherein the laser is configured to generate low power at an imaging plane of the first optical system.

7. The system of claim 1, wherein the second illumination source is a light emitting diode (LED); and wherein the LED is configured to generate low power at an imaging plane of the second optical system.

8. The system of claim 1, wherein the first detection system comprises a charge coupled device (CCD).

9. The system of claim 1, wherein the first scattered beam and the second scattered beam are detected in a reflection mode.

10. The system of claim 1, wherein the first scattered beam and the second scattered beam are detected in a transmission mode.

11. The system of claim 1, wherein the second optical system comprises at least one variable retarder.

12. The system of claim 11, wherein the at least one variable retarder is a liquid crystal retarder.

13. The system of claim 1, wherein the sample is a living biospecimen.

14. The system of claim 1, wherein the processor is further configured to output a thickness value and a material type of the sample.

15. A microscope comprising:

a first illumination source configured to generate a first illumination beam;

a second illumination source configured to generate a second illumination beam;

an objective configured to focus the first illumination beam or the second illumination beam on a sample;

a movable stage configured to alternate between a first position and a second position, wherein in the first position the first illumination beam illuminates the sample and in the second position the second illumination beam illuminates the sample;

a first detection system configured to detect at least a first scattered light beam from the sample when the movable stage is in the first position;

a second detection system configured to detect a second scattered light beam from the sample when the movable stage is in the second position; and a processor configured to generate an optical phase signal based on the at least first scattered light beam and a polarized signal based on the second scattered light beam.

16. The microscope of claim 15, wherein the first illumination source is a laser; and wherein the laser is configured to generate low power at an imaging plane of the microscope.

17. The microscope of claim 15, wherein the second illumination source is a light emitting diode (LED); and wherein the LED is configured to generate low power at an imaging plane of the second optical system.

18. The microscope of claim 15, wherein the first scattered beam and the second scattered beam are detected in a transmission mode.

19. A method for imaging a sample, the method comprising:

illuminating a sample using a first illumination beam generated by a first optical system;

detecting via a detector an interference of a scattered beam from the sample and a reference beam in a first field of view;

generating an optical phase signal based on the detected interference;

illuminating the sample using a second illumination beam generated by a second optical system;

detecting via another detector another scattered beam from the sample in a second field of view;

generating a polarized signal based on the another scattered beam; and generating a co-registered phase and polarization information map based on the optical phase signal and the polarized signal wherein the scattered light beam and the another scattered light beam are detected sequentially and wherein the second field of view is the same as the first field of view, wherein the first optical system comprises:

a first illumination source configured to generate the first illumination beam, and the detector configured to detect at least the first scattered light beam from the sample and to generate the optical phase signal; and wherein the second optical system comprises:

a second illumination source configured to generate the second illumination beam, and the another detector configured to detect a second scattered light beam from the sample and to generate the polarized signal.

* * * * *